3,555,072
STABILIZATION OF TOLYLENE DIISOCYANATE
Ehrenfried H. Kober, Hamden, and Wilhelm J. Schnabel, Branford, Conn., and Paul A. Steudler, Woods Hole, Mass., assignors to Olin Corporation, a corporation of Virginia
No Drawing. Filed Sept. 20, 1968, Ser. No. 761,341
Int. Cl. C07c 49/04
U.S. Cl. 260—453                                3 Claims

ABSTRACT OF THE DISCLOSURE

Discoloration and turbidity formation in tolylene diisocyanates can be inhibited by the addition of a stabilizing amount of a di(higher)alkyl thiodipropionate.

---

This invention relates to a process for stabilizing tolylene diisocyanate. More particularly, this invention relates to a method for inhibiting discoloration and turbidity formation in tolylene diisocyanate.

Tolylene diisocyanate is a commercially available material particularly useful in the preparation of polyurethane foams. Although tolylene diisocyanate can be prepared by a variety of methods, commercial processes prefer phosgenation of tolylene diamines as a practical route to the corresponding diisocyanates. Thus, a mixture of tolylene diamines is dissolved in an inert solvent and reacted with phosgene at elevated temperatures to provide the desired diisocyanates. The resulting reaction mixture is then purged to remove excess phosgene and gaseous by-products prior to recovering the tolylene diisocyanates by distillation.

While the products produced by the aforementioned process, as well as by other acceptable methods, are satisfactory when used shortly after manufacture, they tend to discolor and become turbid upon standing.

Recently it has been established that the formation of turbidity in tolylene diisocyanate is caused by the presence of ortho-isomers of tolylene diisocyanate, which polymerize to insoluble, haziness producing materials. While removal of the ortho-isomers of tolylene diamine, the starting material in the preparation of tolylene diisocyanate, is feasible, it is generally a costly and cumbersome operation detrimental to commercial processes. Furthermore, even preventing the formation or ortho-tolylene diisocyanates by removal of the ortho-isomers of tolylene diamine does not preclude discoloration since this undesirable effect has been observed in products containing only meta-tolylene diisocyanates.

Now it has been found in accordance with this invention that the addition of small amounts of di(higher)alkyl thiodipropionates to tolylene diisocyanates is efficacious in inhibiting both discoloration and turbidity formation for extended periods of time.

As previously mentioned, any isomer of tolylene diisocyanate, and mixtures thereof, can be effectively stabilized according to the process of this invention, and the term "tolylene diisocyanate" in the claims and specification herein is meant to include any such isomer or mixtures of isomers. Thus, for example, 2,4-tolylene diisocyanate, 2,6-tolylene diisocyanate, and mixtures thereof taining tolylene diisocyanates include meta-tolylene diisocyanates containing from about .01 to about 4 percent by weight 2,3- and/or 3,4-tolylene diisocyanate; commercially produced tolylene diisocyanates generally contain up to about .5 percent by weight of these ortho-isomers.

More in detail, the di(higher)alkyl thiodipropionate stabilizer of this invention has the following general formula wherein x is 10 to 18 inclusive:

$$(C_xH_{2x+1}OOCCH_2CH_2)_2S$$

Representative di(higher)alkyl thiodipropionates include dilauryl thiodipropionate, dicetyl thiodipropionate and distearyl thiodipropionate.

Generally the stabilizer is employed in an amount between about .001 and 1 percent by weight based on the tolylene diisocyanate; lesser amounts can be employed, particularly where extended storage periods are not contemplated, and greater amounts can be employed where cost is not a factor. However, it is preferred to employ between about .01 and about 0.5 percent by weight of the stabilizer of this invention.

In addition to effectively precluding discoloration and turbidity formation in various tolylene diisocyanates, the stabilizer of this invention does not adversely effect the reactivity or properties of the stabilized mixture. Thus, it has been found that polyurethane foams made from tolylene diisocyanate mixtures stabilized according to the teaching of this invention had excellent physical properties.

The following examples will serve to illustrate the practice of this invention.

EXAMPLES

Tolylene diamine comprising 80 percent 2,4-tolylene diamine and 20 percent of the 2,6-isomer was dissolved in o-dichlorobenzene and charged to a reactor. After continuous phosgenation at 125–130° C. for about 2.5 hours, the reaction mixture was fed to a purge column. The excess phosgene and hydrogen chloride by-product were purged with nitrogen and the o-dichlorobenzene solvent removed by distillation. The bottoms from the purge column were fed to an evaporator stripper and tolylene diisocyanate, comprising a mixture of the 2,4- and 2,6-isomers, was removed by distillation.

In a separate reactor, 2-3-tolylene diamine was phosgenated in a similar manner and under similar conditions as described for the preparation of the tolylene diisocyanate mixture. During the distillation, the 2,3-tolylene diisocyanate polymerized in the receiver to provide a solid polymeric product having a carbonyl doublet at 5.65–5.75μ, NCO— absorption at 4.45μ and no NH— absorption. Heating of the polymeric tolylene diisocyanate at 250–300° C./15 mm. mercury provided liquid 2,3-tolylene diisocyanate, $n_D^{25}$ 1.5650. Infrared analysis revealed strong NCO— absorption at 4.45μ; an absence of carbonyl and NH— absorption; and absorption peaks at 12.9μ and 13.9μ characteristic of 1,2,3-trisubstituted benzene derivatives.

Two gram samples of the meta-tolylene diisocyanate mixture were placed in glass vials and mixed with varying amounts of the 2,3-tolylene diisocyanate and dilauryl thiodipropionate. The vials were sealed, stored at ambient temperatures in the dark in a desiccator and checked daily for turbidity. The results are set forth in the table below.

TABLE

| Example: | Percent 2,3-TDI[1] | Percent DLTDP[2] | 10 days | 20 days | 30 days | 40 days | 50 days | 60 days | 80 days | 100 days | 140 days | 150 days |
|---|---|---|---|---|---|---|---|---|---|---|---|---|
| 1 | 0 | 0 | — | c | c | c | c | c | c | c | c | -- |
| 2 | 1 | 0 | — | t[3] | t | t | t/c | t/c | t/c | t/c | t/c | ------ |
| 3 | .5 | 0 | — | — | c[4] | c | t/c | t/c | t/c | t/c | t | ------ |
| 4 | 1 | 1 | — | — | — | — | — | — | — | — | t | ------ |
| 5 | .5 | 1 | — | — | — | — | — | — | — | — | t | ---- |
| 6 | .2 | .01 | — | — | — | — | — | — | — | — | — | — |

[1] Tolylene diisocyanate.  [2] Dilauryl thiodipropionate.  [3] Turbid.  [4] Colored (yellowish).
— = no color, no turbidity.

What is claimed is:

1. A process for inhibiting discoloration and turbidity formation in tolylene diisocyanate which comprises adding thereto a stabilizing amount of a compound of the formula $(C_xH_{2x+1}OOCCH_2CH_2)_2S$ wherein $x$ is 10 to 18 inclusive.

2. The process of claim 1 wherein between about .01 and about 0.5 percent by weight of said compound is employed.

3. The process of claim 1 wherein dilauryl thiodipropionate is employed as said compound.

References Cited

UNITED STATES PATENTS 3,281,446  10/1966  Manning et al. _____ 260—453

JOSEPH PAUL BRUST, Primary Examiner

D. H. TORRENCE, Assistant Examiner

U.S. Cl. X.R.

260—2.5, 45.85